UNITED STATES PATENT OFFICE.

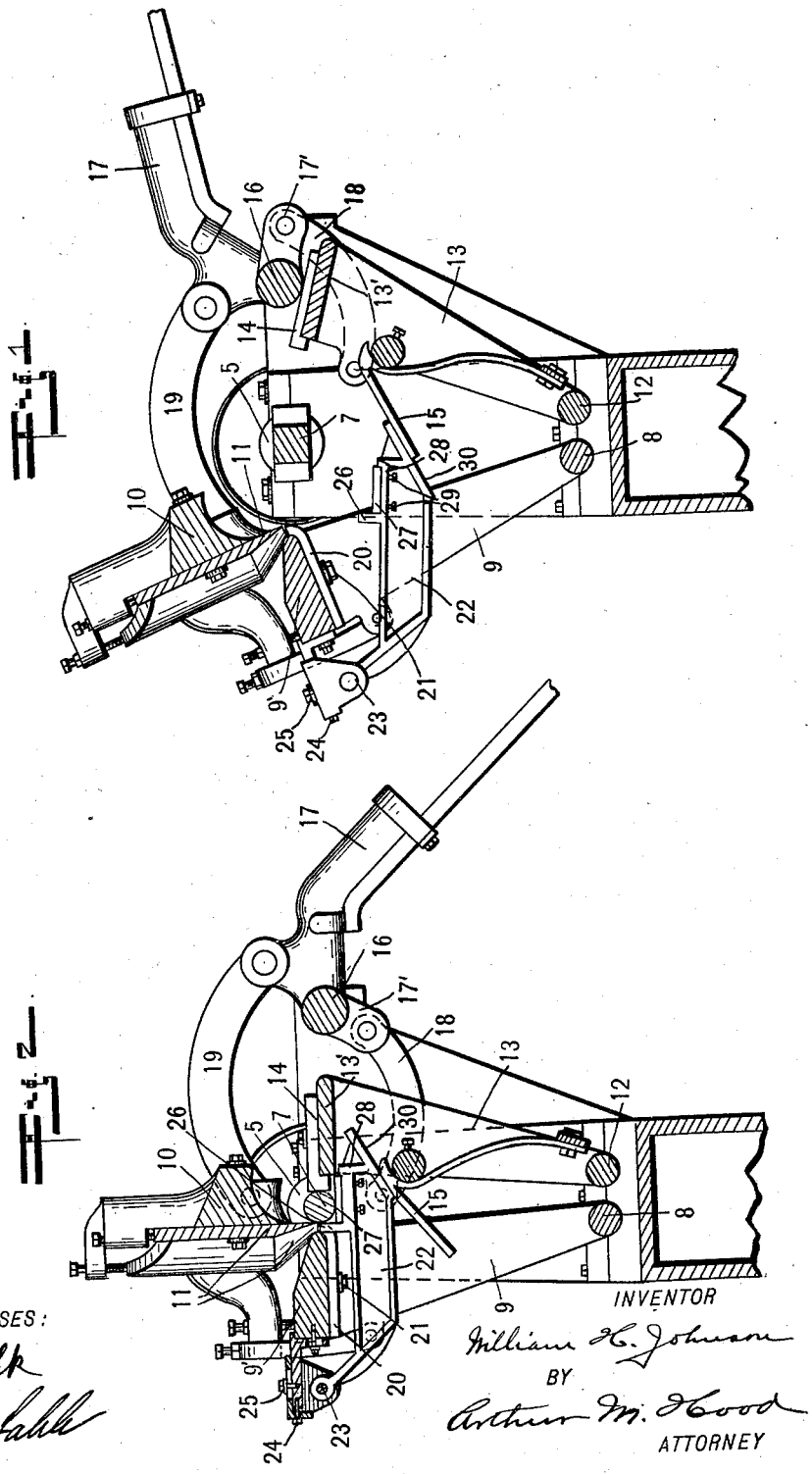

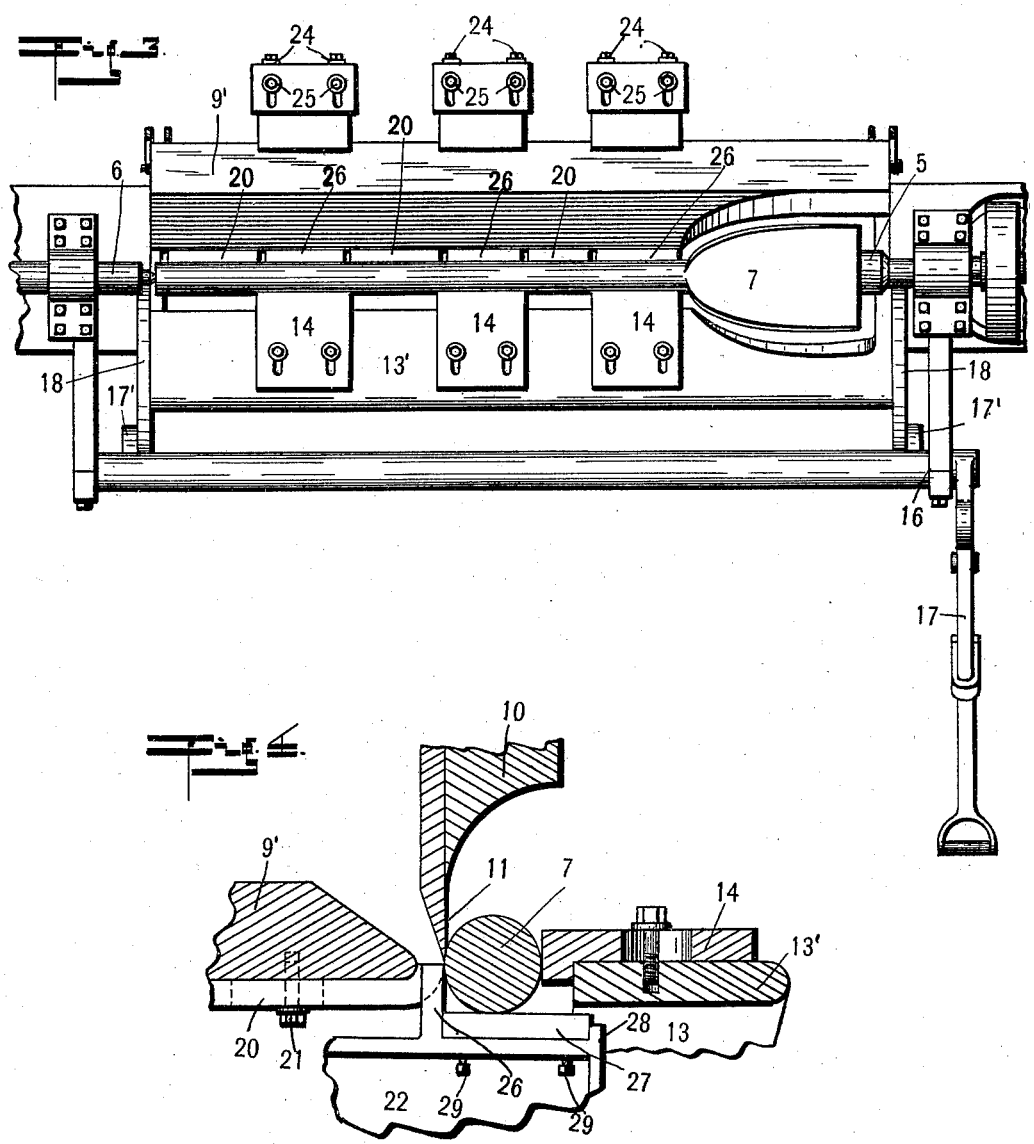

WILLIAM H. JOHNSON, OF VEEDERSBURG, INDIANA.

HANDLE-TURNING LATHE.

SPECIFICATION forming part of Letters Patent No. 683,292, dated September 24, 1901.

Application filed November 10, 1900. Serial No. 36,052. (No model.)

*To all whom it may concern:*

Be it known that I, WILLIAM H. JOHNSON, a citizen of the United States, residing at Veedersburg, in the county of Fountain and State of Indiana, have invented a new and useful Handle-Turning Lathe, of which the following is a specification.

My invention relates to an improvement in wood-turning lathes having a cutting-knife extending the entire length of the work and movable laterally toward and from the axis.

The object of my invention is to produce means in a lathe of this class for causing the knife at the end of its inward stroke to take from the work a gradually tapering or thinning shaving, so as to form a smooth completed article.

The machine illustrated in the drawings is particularly designed for turning shovel-handles.

The accompanying drawings illustrate my invention.

Figure 1 is a transverse section with the parts in position immediately after the insertion of the material to be operated upon. Fig. 2 is a similar view with the parts in the position immediately following the completion of the cutting stroke. Fig. 3 is a plan with cutter 10 and bar 11 removed. Fig. 4 is a detail on an enlarged scale.

In the drawings, 5 and 6 indicate the usual head and tail spindles of a lathe, and 7 indicates the material or handle operated upon. Pivoted upon the base of the lathe at a point 8 some distance below the axis of the lathe is a pair of arms 9, connected at their upper ends with a longitudinal bar 9'. Mounted upon or secured to arms 9 is a bar 10, to which is attached the usual cutter 11. The cutter 11 extends parallel to the axis of the lathe and is given the form to which the handle 7 is to be reduced. Pivoted at 12, adjacent pivot 8, is a pair of arms 13, similar to arms 9, said arms 13 being connected by a longitudinal connecting-bar 13'. Mounted upon bar 13' is a laterally-adjustable pressure-bar 14, which is arranged to be brought into engagement with the handle 7. Secured to arms 13 is a series of cams or guides 15, the purpose of which will be made to appear. Pivoted at 16 on an axis parallel to the axis of the lathe is an operating handle or lever 17, to which is secured upon the opposite side of its axis an arm 17'. Pivoted at one end to arm 17' and at the other end to one of arms 13 is a link 18, and pivoted at one end to handle 17 and at the other end to one of arms 9 is a link 19, the arrangement being such that when handle 17 is swung down the two sets of arms 9 and 13, together with the parts attached thereto, will be turned simultaneously toward the axis of the lathe.

Up to this point the parts described are substantially identical with lathes of this character which have been upon the market for a great number of years.

In former constructions the bar 9' carried a single pressure-bar adapted to coöperate with pressure-bar 14 and knife 11, the said pressure-bar extending practically the entire length of the machine. Beneath this and coöperating with cam 15 was a single rest, also extending nearly the entire length of the handle and adapted to be thrown up into engagement with the handle after it had been brought down to a substantially circular cross-section, said rest, however, coming up beneath the pressure-bar carried by arm 9. In the present construction I secure to bar 9' a series of separated pressure-bars 20, adjustable laterally upon the support by means of bolts 21. The pressure-bars 20 are considerably separated one from another, and their forward ends are adapted to be brought into close proximity to the cutting edge of the knife 11. Pivotally mounted on bar 9' is a series of rests 22, the pivot 23 of each of which is adjustable in two directions upon the support by means of bolts 24 and 25. Pin 23 should be in close proximity to or above a line drawn through the axis of the lathe and touching the cutting edge of the cutter 11 when the said cutter is in its inner position, as shown in Fig. 2. Rest 22 swings beneath the cross-bar 9' and is provided at its inner end with an abutment or finger 26, which is adapted to be brought up into engagement with the handle 7 shortly before it is completed. That portion of the rest 22 which comes into engagement with the under side of the handle 7 is subjected to severe wear, and heretofore it has been necessary to remove the rest from the lathe and occasionally true this wearing-surface by hand. This wearing-surface must come into engagement with the handle 7 after the corners have been taken off, and the engagement with the handle must be continuous and uniform in order to hold the handle in proper position to enable the knife to take a proper cut. I have therefore provided a removable wearing-plate 27, which plate is made of hardened steel and adjustable parallel with the abutment 26 by any suitable means. The most convenient means is to retain the plate longitudinally between the abutment 26 and a short finger 28. The plate may then be vertically adjusted either by means of shims placed therebeneath or by means of set-screws 29. By this means the plate 27 may be accurately adjusted so as to properly coöperate with the knife 11 and the cam-faces 15 and 30. It is also possible to easily remove the plate 27 when it has become worn, so as to grind the upper wearing-face thereof perfectly true, the grinding of said plate being much more easily accomplished than the truing of the wearing-face of the rest now commonly in use.

Rest 22 is provided at its free end with a surface 30, which is arranged to coöperate with the cam or guide 15, the rest swinging freely upon its pivot and lying by its own weight upon the cam. The rests 22 are arranged so as to allow abutments 26 to swing up between the pressure-bars 20, as shown clearly in Fig. 2, and the arrangement of the pivot 23 is such that when the parts are in the positions shown in Fig. 2 abutment 26 of each rest has come into engagement with that side of the handle immediately adjacent the cutter 11 and has not yet reached the maximum of its throw toward the axis, so that said abutment exerts a pressure substantially directly toward the axis, so as to operate to gradually crowd or spring the handle away from the cutter, and thus cause the production of a gradually-tapering chip near the end of the stroke, said chip tapering to nothing at the close.

It will be readily understood that the pressure-bars 20 may be formed in a single piece, with notches formed in the operating edges for the reception of the abutments 26 of the rests. The rests 22 may also be united and provided with separated fingers or abutments 26. For the sake of ease and nicety of adjustment, however, I prefer the arrangement previously described.

I claim as my invention—

1. In a turning-lathe, the combination with a laterally-movable knife, of a pressure-bar adjacent thereto and of less length than the knife, a swinging rest, an abutment carried by said rest in position to engage the material beyond the end of the pressure-bar and upon the same side as the knife, the pivotal support of said rest being upon the knife side of the plane containing the axis of the lathe and the cutting edge of the knife when in its inner position, and means for automatically throwing said abutment into engagement with the material operated upon immediately adjacent the cutting edge of the knife so as to exert a pressure substantially toward the axis.

2. In a turning lathe, the combination with a laterally-movable knife, of a series of separated pressure-bars adjacent said knife, a series of swinging rests, an abutment carried by each of said rests in position to engage the material on the same side as the knife, the pivotal support of said rest being upon the knife side of the plane containing the axis of the lathe and the cutting edge of the knife when in its inner position, and means for automatically throwing said abutment into engagement with the material operated upon between the pressure-bars.

3. In a turning-lathe, the combination with a laterally-movable knife, of a pressure-bar adjacent thereto and of less length than the knife, a swinging rest, an abutment carried by said rest in position to engage the material beyond the end of the pressure-bar and upon the same side as the knife, a pivotal support for said rest upon the knife side of the plane containing the axis of the lathe and the cutting edge of the knife when in its inner position, means for adjusting the position of said pivotal support, and means for automatically throwing said abutment into engagement with the material operated upon immediately adjacent the cutting edge of the knife.

4. In a turning-lathe, the combination with a laterally-movable knife, of a pressure-bar adjacent thereto and of less length than the knife, a swinging rest, an abutment carried by said rest in position to engage the material beyond the end of the pressure-bar and upon the same side as the knife, the pivotal support of said rest being upon the knife side of the plane containing the axis of the lathe and the cutting edge of the knife when in its inner position, a wearing-plate mounted upon said rest adjacent said abutment and adjustable parallel with said abutment, and means for automatically throwing said abutment into engagement with the material operated upon immediately adjacent the cutting edge of the knife.

5. In a turning-lathe, the combination with a laterally-movable knife, of a pressure-bar adjacent thereto and of less length than the knife, a swinging rest, an abutment carried by said rest in position to engage the material upon the same side as the knife, the arrangement being such that as the knife is moved toward the axis the abutment will be swung up into engagement with the material and into close proximity to the cutting edge of the knife beyond the end of the pressure-bar.

6. In a turning-lathe, the combination with a laterally-movable knife, of a series of separated pressure-bars adjacent said knife, a series of swinging rests, and an abutment carried by each of said rests in position to engage the material on the same side as the knife, the arrangement being such that as the knife is drawn toward the axis said abutment will be brought into engagement with the material and into close proximity to the cutting edge of the knife between the pressure-bars.

7. In a turning-lathe, the combination with a laterally-movable knife, of a pressure-bar adjacent thereto but extending only a portion of the length thereof, a movable rest, an abutment carried by said rest in position to engage the material on the same side as the knife, and means for simultaneously moving said knife and abutment toward the axis and bringing the abutment in its final position immediately adjacent the cutting edge of the knife beyond the end of the pressure-bar.

8. In a turning-lathe, the combination with a laterally-movable knife, of a swinging rest, a pair of parallel abutments 26 and 28 carried thereby, a removable wearing-plate mounted between said abutments, and means for adjusting said wearing-plate parallel with said abutments.

WILLIAM H. JOHNSON.

Witnesses:
 ARTHUR M. HOOD,
 BERTHA M. BALLARD.